US009749787B2

United States Patent
Zhang (10) Patent No.: US 9,749,787 B2
(45) Date of Patent: Aug. 29, 2017

(54) ZIGBEE-BASED ARTICLE SEARCHING METHOD, DEVICE AND SYSTEM

(71) Applicant: BOE TECHNOLOGY GROUP CO., LTD., Beijing (CN)

(72) Inventor: Yifei Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/086,494

(22) Filed: Mar. 31, 2016

(65) Prior Publication Data

US 2017/0034652 A1    Feb. 2, 2017

(30) Foreign Application Priority Data

Jul. 30, 2015    (CN) .......................... 2015 1 0459952

(51) Int. Cl.
*H04W 4/02* (2009.01)
*H04W 4/00* (2009.01)

(52) U.S. Cl.
CPC ............. *H04W 4/02* (2013.01); *H04W 4/008* (2013.01); *H04Q 2209/43* (2013.01)

(58) Field of Classification Search
None
See application file for complete search history.

(56) References Cited

U.S. PATENT DOCUMENTS 8,478,292 B2 * 7/2013 Kim .......................... G01S 5/14
342/451

2007/0205895 A1    9/2007 Bergener
2014/0329537 A1 * 11/2014 Huang ................ H04W 64/003
455/456.1

(Continued)

FOREIGN PATENT DOCUMENTS

| CN | 101639971 A | 2/2010 |
|---|---|---|
| CN | 102540143 A | 7/2012 |
| CN | 103024898 A | 4/2013 |

(Continued)

OTHER PUBLICATIONS

Liu et al. (CN 103997781 A). EPO translation of Applicant filed reference.*

(Continued)

*Primary Examiner* — David Bilodeau
(74) *Attorney, Agent, or Firm* — Nath, Goldberg & Meyer; Joshua B. Goldberg; Annie J. Kock (57) ABSTRACT

The invention discloses a ZigBee-based article searching method, device and system. The method includes: receiving article label signal sent by an article label; generating article position information according to intensity of the article label signal and reference label signal intensity corresponding to at least one preset reference label; and sending the article position information to a terminal device of a user. In the technical solutions provided by the invention, article position information is generated according to the article label signal intensity and the reference label signal intensity corresponding to at least one preset reference label, and then the article position information is sent to the terminal device of the user, so that the position information of an article can be obtained in real time by adopting the solutions of the invention.

15 Claims, 4 Drawing Sheets

(56) References Cited

U.S. PATENT DOCUMENTS

2015/0373491 A1* 12/2015 Lim .................. G01S 5/0257
455/456.1
2016/0011294 A1* 1/2016 Kim .................. G01S 5/0236
455/456.1

FOREIGN PATENT DOCUMENTS

| CN | 103546867 A | 1/2014 |
| CN | 103997781 A | 8/2014 |
| JP | 2008-234281 A | 10/2008 |

OTHER PUBLICATIONS

Chen et al. (CN 101639971A). EPO translation of Applicant filed reference.*
1st office action issued in corresponding Chinese application No. 201510459952.4 dated Jul. 7, 2016.

* cited by examiner

ZIGBEE-BASED ARTICLE SEARCHING METHOD, DEVICE AND SYSTEM

FIELD OF THE INVENTION

The present invention relates to a ZigBee-based article searching method, device and system.

BACKGROUND OF THE INVENTION

ZigBee is a low power consumption local area network protocol based on IEEE802.15.4 standards. According to the provisions of international standards, ZigBee technology is a short-distance and low power consumption wireless communication technology, has the characteristics of short distance, low complexity, self-organization, low power consumption, low data rate and the like, is mainly applied in the fields of automatic control and remote control, and can be embedded into various devices. In short, ZigBee is a short-distance wireless networking communication technology which is cheap and low in power consumption. According to the characteristics of the ZigBee technology, two AA dry batteries can support one node to work for 6 to 24 months and even longer in a low power standby mode. In comparison, the node can only work for a few weeks in a Bluetooth-based technical solution and a few hours in a WiFi-based technical solution. Besides, the ZigBee signal transmission range is generally 10-100 m, moreover, with a fast response speed, the node generally enters the working state from sleep within 15 ms and is connected to a network within 30 ms. In conclusion, the ZigBee technology is very suitable for home environment.

At present, the ZigBee technology is less involved in the field of smart home. When an article moves, the position information of the article cannot be obtained in real time.

SUMMARY OF THE INVENTION

The present invention provides a ZigBee-based article searching method, device and system for acquiring the position information of an article.

According to one aspect of the present invention, provided is a ZigBee-based article searching method, including: receiving an article label signal sent by an article label, and detecting article label signal intensity; generating article position information according to the article label signal intensity and reference label signal intensity corresponding to at least one preset reference label; and sending the article position information to a terminal device of a user.

According to an embodiment of the present invention, the number of the reference labels may be multiple, and the step of generating article position information according to the article label signal intensity and the reference label signal intensity corresponding to at least one preset reference label may include: generating the reference label signal intensity according to position information of each reference label; generating a relative distance according to the reference label signal intensity and the article label signal intensity; and forming a plurality of circular ranges by taking each reference label as a circle center and taking the relative distance as a radius, and obtaining article position information from an superposed area of the plurality of circular ranges.

According to an embodiment of the present invention, the step of generating the reference label signal intensity according to the position information of each reference label may include: calculating the reference label signal intensity according to the reference label position information through the following formula:

$$RSSI1 = -(A + 10 \times N \times lg(D))$$

wherein RSSI1 is the reference label signal intensity; A is signal intensity of the reference label when a distance between the reference label and a ZigBee gateway is 1 meter, and when there are a plurality of reference labels, A is mean value of signal intensities of the reference labels when distances between the plurality of reference labels and the ZigBee gateway are 1 meter; N is a signal propagation constant; D is the reference label position information, which is a distance between a reference label and a ZigBee gateway, and when there are a plurality of reference labels, D is mean value of distances between the plurality of reference labels and the ZigBee gateway.

According to an embodiment of the present invention, the step of generating the relative distance according to the reference label signal intensity and the article label signal intensity may include: calculating the relative distance according to the reference label signal intensity and the article label signal intensity through the following formula:

$$d = 10^{\frac{A + |RSSI1 - RSSI2|}{-10N}}$$

wherein d is the relative distance, which is a distance between a reference label and an article label; and RSSI2 is the article label signal intensity.

According to an embodiment of the present invention, the number of the reference labels may be one, and the step of generating article position information according to the article label signal intensity and the reference label signal intensity corresponding to at least one preset reference label may include: generating the reference label signal intensity according to reference label position information; generating a relative distance according to the reference label signal intensity and the article label signal intensity; and forming a circular range by taking the reference label as a circle center and taking the relative distance as a radius, and obtaining the article position information from an area covered by the circular range.

According to an embodiment of the present invention, before the step of receiving the article label signal sent by the article label and detecting the article label signal intensity, the ZigBee-based article searching method may further include: sending trigger information to the article label according to a preset label name corresponding to the article label, so that the article label is activated.

According to an embodiment of the present invention, before the step of sending the trigger information to the article label according to the preset label name corresponding to the article label, the ZigBee-based article searching method may further include: judging whether a distance between a preset positioning label held by the user and the article label is greater than a set prompt distance; when the distance between the positioning label and the article label is greater than the set prompt distance, sending prompt information to the terminal device of the user, and when the distance between the positioning label and the article label is smaller than or equal to the set prompt distance, continuing to execute a subsequent step.

According to another aspect of the present invention, provided is a ZigBee-based article searching device, including: a ZigBee gateway, used for receiving an article label signal sent by an article label and detecting article label signal intensity; a data processing module, used for generating article position information according to the article label signal intensity and reference label signal intensity corresponding to at least one preset reference label; and a communication module, used for sending the article position information to terminal device of a user.

According to an embodiment of the present invention, the number of the reference labels may be multiple, and the data processing module may be used for generating the reference label signal intensity according to position information of each reference label; generating a relative distance according to the reference label signal intensity and the article label signal intensity; and forming a plurality of circular ranges by taking each reference label as a circle center and taking the relative distance as a radius, and obtaining the article position information from a superposed area of the plurality of circular ranges.

According to an embodiment of the present invention, the number of the reference labels may be one, and the data processing module may be used for generating the reference label signal intensity according to reference label position information; generating a relative distance according to the reference label signal intensity and the article label signal intensity; and forming a circular range by taking the reference label as a circle center and taking the relative distance as a radius, and obtaining article position information from an area covered by the circular range.

According to an embodiment of the present invention, the ZigBee gateway may be further used for sending trigger information to the article label according to a preset label name corresponding to the article label, so that the article label is activated.

According to an embodiment of the present invention, the ZigBee-based article searching device may further include an alarm module, which is used for sending alarm information after the communication module sends the article position information to the terminal device of the user.

According to another embodiment of the present invention, the ZigBee-based article searching device may further include an alarm module, and the data processing module may be further used for judging whether a distance between a preset positioning label held by the user and the article label is greater than a set prompt distance. When the distance between the positioning label and the article label is greater than the set prompt distance, the alarm module may send prompt information to the terminal device of the user; and when the distance between the positioning label and the article label is smaller than or equal to the set prompt distance, the ZigBee gateway may send trigger information to the article label according to a preset label name corresponding to the article label.

According to another aspect of the present invention, provided is a ZigBee-based article searching system, including a terminal device, an article label, a plurality of reference labels and the ZigBee-based article searching device of the present invention. The article label is used for sending article label signal. The terminal device is used for receiving the article position information.

According to the ZigBee-based article searching method, device and system provided by the present invention, article position information may be generated according to the article label signal intensity and the reference label signal intensity corresponding to at least one preset reference label, and then the article position information is sent to the terminal device of the user, so that the position information of the article can be obtained in real time.

BRIEF DESCRIPTION OF THE DRAWINGS

The embodiments of the present invention will be described in detail below with reference to the accompanying drawings, in which.

DETAILED DESCRIPTION OF THE EMBODIMENTS

In order that those skilled in the art can better understand the technical solutions of the present invention, the embodiments of the present invention will be described in detail below in conjunction with the accompanying drawings. However, the embodiments can be implemented in a variety of different forms, and should not be understood as being limited to those described herein. On the contrary, these embodiments are intended to render the present disclosure thorough and complete, and will sufficiently convey exemplary implementations to those skilled in the art.

Figure 1:
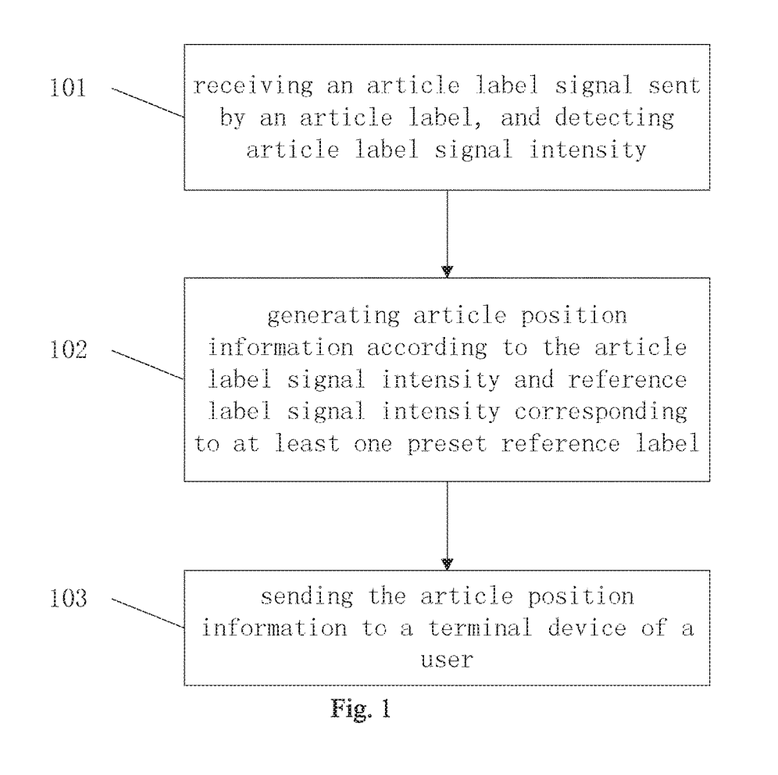
FIG. 1 is a flow diagram of a ZigBee-based article searching method according to one embodiment of the present invention.

FIG. 1 is a flow diagram of a ZigBee-based article searching method according to an embodiment of the present invention. As shown in FIG. 1, the ZigBee-based article searching method according to the embodiment of the present invention includes:

receiving an article label signal sent by an article label, and detecting article label signal intensity (step 101);

generating article position information according to the article label signal intensity and reference label signal intensity corresponding to at least one preset reference label (step 102); and sending the article position information to a terminal device of a user (step 103).

Each step in this embodiment may be executed by a ZigBee-based article searching device. The article label is a removable label which can be attached to the surface of an article. Reference label information is information of a reference label. The terminal device may include a mobile phone or a PAD or the like.

In this embodiment, one or more reference labels may be preset. According to the embodiment of the present invention, at least three reference labels may be preset.

When the number of the reference label is one, step 102 may include: generating reference label signal intensity according to reference label position information; generating a relative distance according to the reference label signal intensity and the article label signal intensity; and forming a circular range by taking the reference label as the circle center and taking the relative distance as the radius, and obtaining article position information from the area covered by the circular range. The article position is located at a certain position on the edge of the circle, so that the position of the article may be roughly determined.

When the number of the reference labels is multiple, step 102 may include: generating reference label signal intensity according to the position information of each reference label; generating a relative distance according to the reference label signal intensity and the article label signal intensity; and forming a plurality of circular ranges by taking each reference label as the circle center and taking the relative distance as the radius, and obtaining article position information from the superposed area of the plurality of circular ranges. A coordinate value can be randomly selected from the superposed area of the plurality of circular ranges as the article position information. The article position information obtained by adopting a plurality of reference labels is more accurate.

According to the ZigBee-based article searching method of this embodiment, article position information may be generated according to the article label signal intensity and the reference label signal intensity corresponding to at least one preset reference label, and then the article position information is sent to the terminal device of the user, so that the position information of the article can be obtained in real time.

Figure 2:
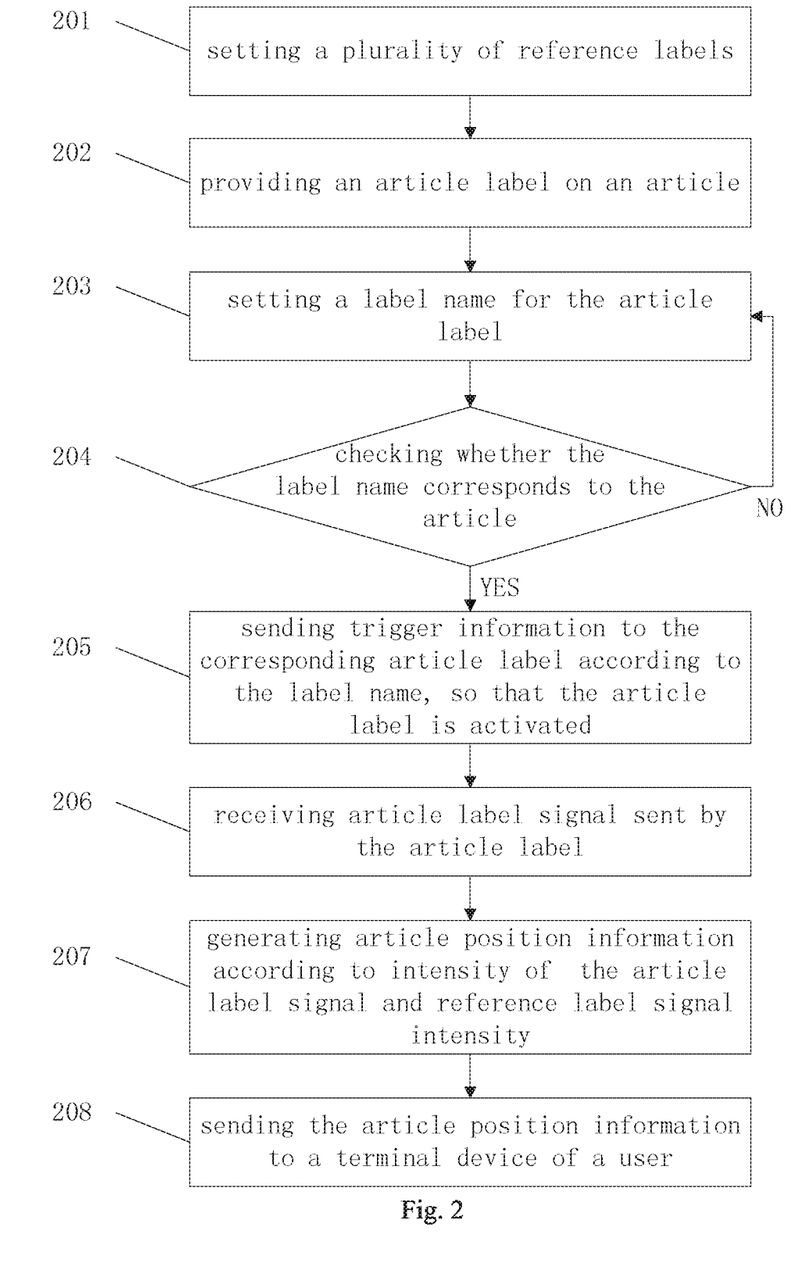
FIG. 2 is a flow diagram of a ZigBee-based article searching method according to another embodiment of the present invention.

FIG. 2 is a flow diagram of a ZigBee-based article searching method according to another embodiment of the present invention. As shown in FIG. 2, the ZigBee-based article searching method according to another embodiment of the present invention includes setting a plurality of reference labels (step 201). The reference labels are reference points for obtaining the article label position. In this embodiment, a plurality of reference labels may be set for accurately obtaining the article position information of an article. According to the embodiment of the present invention, at least three reference labels are set. For example, a plurality of reference labels may be set by a user.

The ZigBee-based article searching method according to this embodiment further includes providing an article label on an article (step 202). The article label is a removable lable which can be attached to the surface of the article. For example, the article label can be provided on the article by a user.

The ZigBee-based article searching method according to this embodiment further includes setting a label name for the article label (step 203). According to this embodiment, a corresponding label name may be set for each article label. For example, a label name set for an article label on a key is "key", while a label name set for an article label on a wallet is "wallet". The label name may be set for the article label by a ZigBee gateway.

The ZigBee-based article searching method according to this embodiment further includes checking whether the label name corresponds to the article (step 204). If the label name corresponds to the article, step 205 is executed; if the label name does not correspond to the article, the process returns to step 203, so that a label name is reset for the article label. Whether the label name corresponds to the article may be checked by the ZigBee gateway.

In step 205, trigger information is sent to the corresponding article label according to the label name, so that the article label is activated. The article label may be in a standby state before being activated, and is activated after receiving the trigger information. Subsequently, the article label sends an article label signal. The trigger information may be sent to the corresponding article label by the ZigBee gateway according to the label name. Specifically, the user may click the label name of the article label needing to be activated through the terminal device, to control the ZigBee gateway to send the trigger information to the article label.

Similar to the aforementioned embodiment, the ZigBee-based article searching method according to this embodiment further includes: receiving the article label signal sent by the article label, and detecting article label signal intensity (step 206); generating article position information according to the article label signal intensity and reference label signal intensity corresponding to at least one preset reference label (step 207); and sending the article position information to the terminal device of the user (step 208).

After the article label is activated, the article label sends the article label signal to the ZigBee gateway, and the ZigBee gateway receives the article label signal sent by the article label and detects the article label signal intensity.

Similar to step 102, step 207 may include: generating reference label signal intensity according to reference label position information; generating a relative distance according to the reference label signal intensity and the article label signal intensity; and forming a circular range by taking the reference label as the circle center and taking the relative distance as the radius, and obtaining article position information from the area covered by the circular range.

The reference label signal intensity may be calculated according to the following formula:

$$RSSI1 = -(A + 10 \times N \times lg(D))$$

wherein RSSI1 is the reference label signal intensity; A is the signal intensity of the reference label when the distance between the reference label and the ZigBee gateway is 1 meter, and when there are a plurality of reference labels, A is mean value of signal intensities of the reference labels when the distances between the plurality of reference labels and the ZigBee gateway are 1 meter; N is a signal propagation constant (also referred to as a propagation coefficient); D is the reference label position information, which is the distance between the reference label and the ZigBee gateway, and when there are a plurality of reference labels, D is mean value of distances between the plurality of reference labels and the ZigBee gateway. In different environments, A and N may have different values, and therefore need to be calibrated before use.

Moreover, the relative distance may be calculated through the following formula:

$$d = 10^{\frac{A + |RSSI1 - RSSI2|}{-10N}}$$

wherein d is the relative distance, which is the distance between the reference label and the article label; and RSSI2 is the article label signal intensity.

In step 208, the article position information may be sent to the terminal device of the user by a communication module. After the terminal device receives the article position information, the user may find the article through the article position information displayed on the terminal device.

The article can be actively searched by the ZigBee-based article searching method according to this embodiment. More accurate article position information may be obtained in the presence of a plurality of reference labels. According to this embodiment, the calculation method of the article position information is simple and accurate in calculation result, and the method for activating the reference labels is simple and easy to implement.

Figure 3:
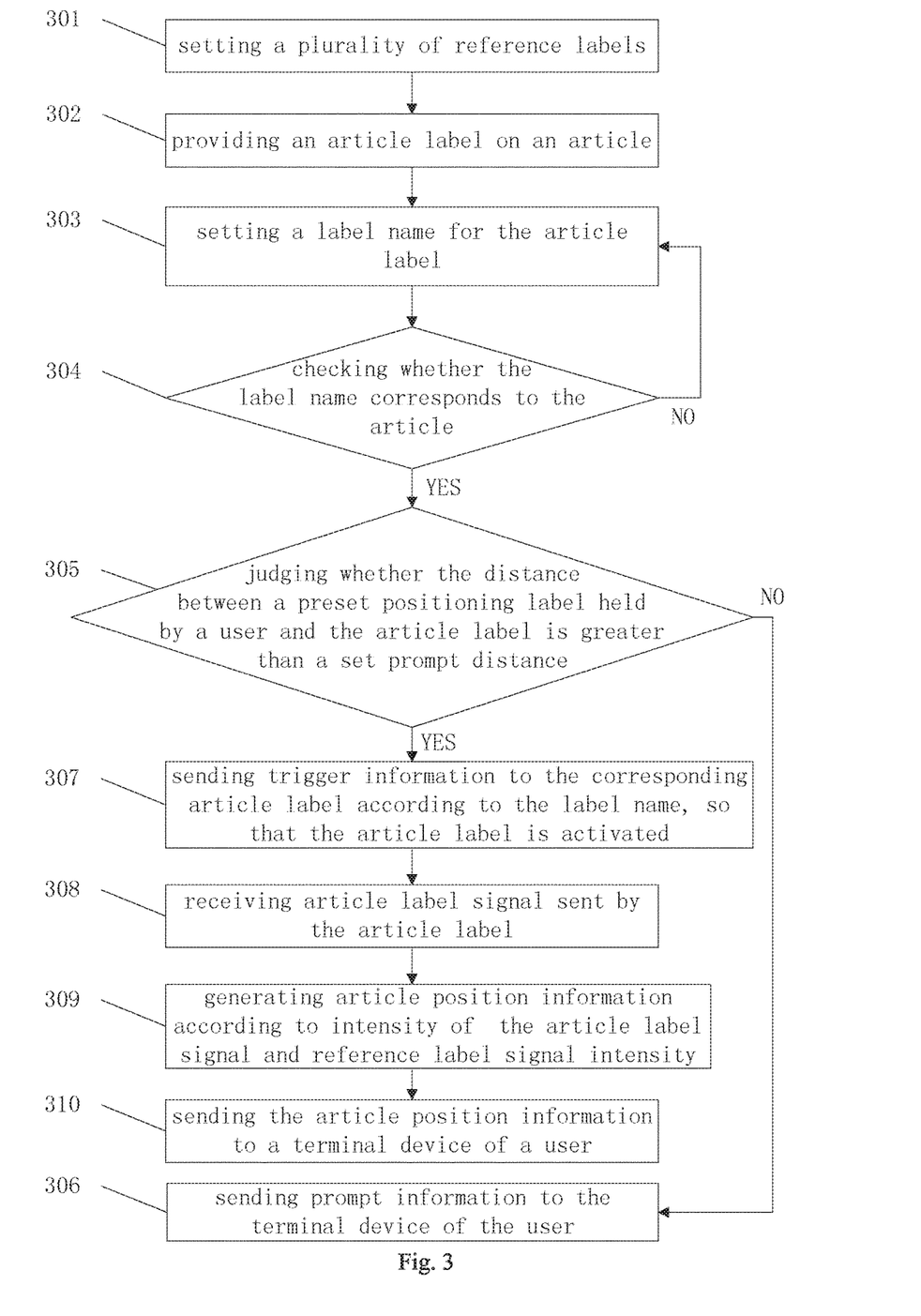
FIG. 3 is a flow diagram of a ZigBee-based article searching method according to another embodiment of the present invention.

FIG. 3 is a flow diagram of a ZigBee-based article searching method according to another embodiment of the present invention. Compared with the embodiment described above with reference to FIG. 2, the method shown in FIG. 3 further includes: judging whether the distance between a preset positioning label held by the user and the article label is greater than a set prompt distance (step 305); and when the distance between the positioning label and the article label is greater than the set prompt distance, sending prompt information to the terminal device of the user (step 306).

Steps 301 to 304 shown in FIG. 3 are similar to steps 201 to 204 in the embodiment described with reference to FIG. 2. Moreover, steps 307 to 310 shown in FIG. 3 are similar to steps 205 to 208 in the embodiment described with reference to FIG. 2. Thus, detailed description of the steps same as or similar to those in the aforementioned embodiment is omitted herein.

When the distance between the positioning label and the article label is greater than the set prompt distance ("No" in step 305), step 306 is executed; when the distance between the positioning label and the article label is smaller than or equal to the set prompt distance ("Yes" in step 305), step 307 is executed, that is, the subsequent step is continued to be executed.

According to this embodiment, the positioning label held by the user can be used for marking the position of the user; and when the distance between the positioning label and the article label is greater than the set prompt distance, it indicates the user is too far from the article, for example, forgetting carrying the article.

According to the ZigBee-based article searching method of this embodiment, when the distance between the positioning label held by the user and the article label is greater than the set prompt distance, prompt information is sent to the user, to prompt the user to carry the article.

Figure 4:
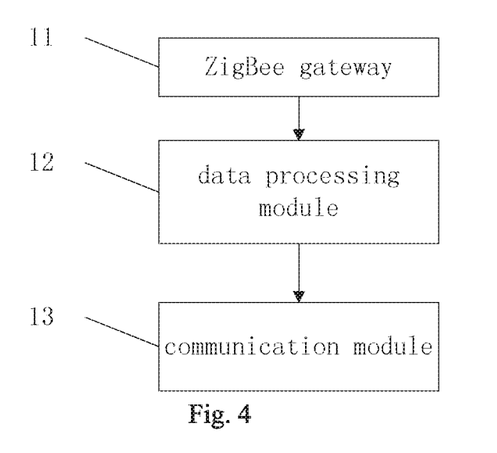
FIG. 4 is a structural schematic diagram of a ZigBee-based article searching device according to an embodiment of the present invention.

FIG. 4 is a structural schematic diagram of a ZigBee-based article searching device according to an embodiment of the present invention. As shown in FIG. 4, the ZigBee-based article searching device according to an embodiment of the present invention includes a ZigBee gateway 11, a data processing module 12 and a communication module 13.

The ZigBee gateway 11 is used for receiving an article label signal sent by an article label and detecting article label signal intensity. The data processing module 12 is used for generating article position information according to the article label signal intensity and reference label signal intensity corresponding to at least one preset reference label. The communication module 13 is used for sending the article position information to the terminal device of a user.

When the number of the reference labels is multiple, the data processing module 12 may generate reference label signal intensity according to the position information of each reference label; generate a relative distance according to the reference label signal intensity and the article label signal intensity; and form a plurality of circular ranges by taking each reference label as the circle center and taking the relative distance as the radius, and obtain article position information from the superposed area of the plurality of circular ranges.

When the number of the reference labels is one, the data processing module 12 may be used for generating reference label signal intensity according to reference label position information; generating a relative distance according to the reference label signal intensity and the article label signal intensity; and forming a circular range by taking the reference label as the circle center and taking the relative distance as the radius, and obtaining article position information from the area covered by the circular range.

The ZigBee gateway 11 may be further used for sending trigger information to the article label according to a preset label name corresponding to the article label, so that the article label is activated.

The ZigBee-based article searching device according to the embodiment of the present invention may further include an alarm module (not shown in the figure) arranged on the article label. The alarm module may be used for sending alarm information after the communication module 13 sends the article position information to the terminal device of the user. Specifically, the alarm module may include (but not limited to) a buzzer for producing sound information as the alarm information, so as to facilitate finding the article quickly.

Moreover, the data processing module 12 may be further used for judging whether the distance between a preset positioning label held by the user and the article label is greater than a set prompt distance. When the distance between the positioning label and the article label is greater than the set prompt distance, the alarm module may send prompt information to the terminal device of the user. When the distance between the positioning label and the article label is smaller than or equal to the set prompt distance, the ZigBee gateway 11 may send trigger information to the article label according to a preset label name corresponding to the article label.

According to the embodiment of the present invention, the alarm module may include a prompt module, which is used for sending prompt information to the terminal device of the user. The prompt module may be a chip with a communication function. In this case, when the distance between the user and the article is long, the user may be prompted to carry the article by sending the prompt information.

According to the ZigBee-based article searching device of this embodiment, article position information may be generated according to the article label signal intensity and the reference label signal intensity corresponding to at least one preset reference label, and then the article position information is sent to the terminal device of the user, so that the position information of the article is obtained in real time.

Figure 5:
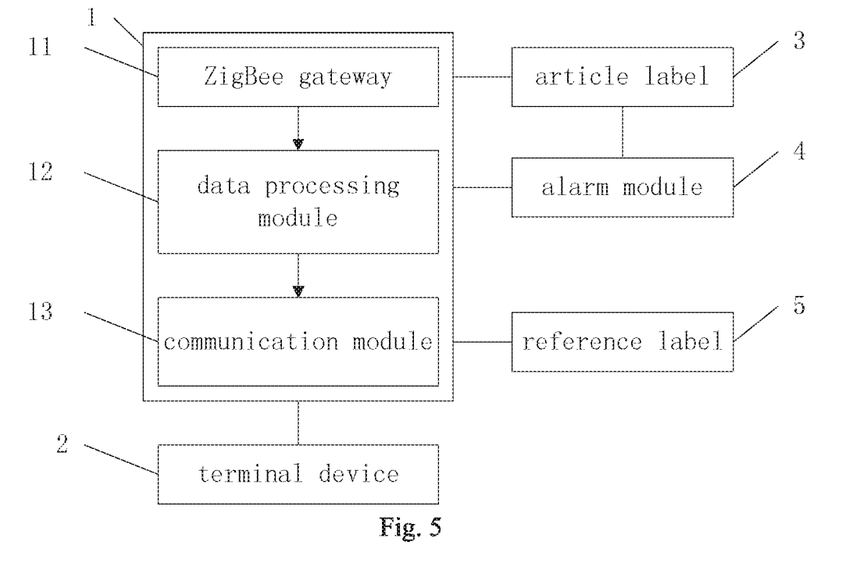
FIG. 5 is a structural schematic diagram of a ZigBee-based article searching system according to an embodiment of the present invention.

FIG. 5 is a structural schematic diagram of a ZigBee-based article searching system according to an embodiment of the present invention. As shown in FIG. 5, the ZigBee-based article searching system according to an embodiment of the present invention includes a ZigBee-based article searching device 1, a terminal device 2, an article label 3 and a reference label 4. The ZigBee-based article searching device 1 may be the one according to the present invention. The article label 3 is used for sending article label signal. The terminal device 2 is used for receiving article position information.

According to the ZigBee-based article searching system of this embodiment, article position information can be generated according to the article label signal intensity and the reference label signal intensity corresponding to at least one preset reference label, and then the article position information is sent to the terminal device of the user, so that the position information of the article is obtained in real time.

It could be understood that the above embodiments are merely exemplary embodiments adopted for describing the principle of the present invention, but the present invention is not limited thereto. Various variations and improvements may be made for those of ordinary skill in the art without departing from the spirit and essence of the present invention, and these variations and improvements are also regarded as falling into the protection scope of the present invention.

The invention claimed is:

1. A ZigBee-based article searching method, comprising:
receiving an article label signal sent by an article label, and detecting article label signal intensity;
generating article position information according to the article label signal intensity and reference label signal intensity corresponding to at least one preset reference label; and
sending the article position information to a terminal device of a user,
wherein number of the reference labels is multiple, and the step of generating article position information according to the article label signal intensity and the reference label signal intensity corresponding to at least one preset reference label comprises:
generating the reference label signal intensity according to position information of each reference label;
generating a relative distance according to the reference label signal intensity and the article label signal intensity; and
forming a plurality of circular ranges by taking each reference label as a circle center and taking the relative distance as a radius, and obtaining the article position information from a superposed area of the plurality of circular ranges, and
wherein the step of generating the reference label signal intensity according to the position information of each reference label comprises:
calculating the reference label signal intensity according to the reference label position information through the following formula:

RSSI1=−(A+10×N×lg(D)), wherein

RSSI1 is the reference label signal intensity;
A is signal intensity of a reference label when a distance between the reference label and a ZigBee gateway is 1 meter, and when there are a plurality of reference labels, A is mean value of signal intensities of the reference labels when distances between the plurality of reference labels and the ZigBee gateway are 1 meter;
N is a signal propagation constant;
D is the reference label position information, which is a distance between a reference label and a ZigBee gateway, and when there are a plurality of reference labels, D is mean value of distances between the plurality of reference labels and the ZigBee gateway.

2. The ZigBee-based article searching method of claim 1, wherein the step of generating the relative distance according to the reference label signal intensity and the article label signal intensity comprises:
calculating the relative distance according to the reference label signal intensity and the article label signal intensity through the following formula:

$$d = 10^{\frac{A + |RSSI1 - RSSI2|}{-10N}},$$

wherein
d is the relative distance, which is a distance between a reference label and an article label; and
RSSI2 is the article label signal intensity.

3. The ZigBee-based article searching method of claim 1, wherein before the step of receiving the article label signal sent by the article label and detecting the article label signal intensity, the method further comprises:
sending trigger information to the article label according to a preset label name corresponding to the article label, so that the article label is activated.

4. The ZigBee-based article searching method of claim 3, wherein before the step of sending the trigger information to the article label according to the preset label name corresponding to the article label, the method further comprises:
judging whether a distance between a preset positioning label held by the user and the article label is greater than a set prompt distance;
when the distance between the positioning label and the article label is greater than the set prompt distance, sending prompt information to the terminal device of the user; and
when the distance between the positioning label and the article label is smaller than or equal to the set prompt distance, continuing to execute a subsequent step.

5. A ZigBee-based article searching method, comprising:
receiving an article label signal sent by an article label, and detecting article label signal intensity;
generating article position information according to the article label signal intensity and reference label signal intensity corresponding to at least one preset reference label; and
sending the article position information to a terminal device of a user,
wherein number of the reference labels is one, and the step of generating article position information according to the article label signal intensity and the reference label signal intensity corresponding to at least one preset reference label comprises:
generating the reference label signal intensity according to reference label position information;
generating a relative distance according to the reference label signal intensity and the article label signal intensity; and
forming a circular range by taking the reference label as a circle center and taking the relative distance as a radius, and obtaining the article position information from an area covered by the circular range,
wherein the step of generating the reference label signal intensity according to the position information of each reference label comprises:
calculating the reference label signal intensity according to the reference label position information through the following formula:

RSSI1=−(A+10×N×lg(D)), wherein

RSSI1 is the reference label signal intensity;
A is signal intensity of a reference label when a distance between the reference label and a ZigBee gateway is 1 meter;
N is a signal propagation constant and
D is the reference label position information, which is a distance between a reference label and a ZigBee gateway.

6. A ZigBee-based article searching device, comprising:
a ZigBee gateway, used for receiving an article label signal sent by an article label and detecting article label signal intensity;
a data processing module, used for generating article position information according to the article label signal intensity and reference label signal intensity corresponding to at least one preset reference label; and a communication module, used for sending the article position information to a terminal device of a user, wherein number of the reference labels is multiple, and the data processing module is used for:

generating the reference label signal intensity according to position information of each reference label;

generating a relative distance according to the reference label signal intensity and the article label signal intensity; and forming a plurality of circular ranges by taking each reference label as a circle center and taking the relative distance as a radius, and obtaining the article position information from a superposed area of the plurality of circular ranges, and wherein generating the reference label signal intensity according to the position information of each reference label comprises:

calculating the reference label signal intensity according to the reference label position information through the following formula:

$$RSSI1 = -(A10 \times N \times lg(D)), \text{ wherein}$$

RSSI1 is the reference label signal intensity;

A is signal intensity of a reference label when a distance between the reference label and a ZigBee gateway is 1 meter, and when there are a plurality of reference labels, A is mean value of signal intensities of the reference labels when distances between the plurality of reference labels and the ZigBee gateway are 1 meter;

N is a signal propagation constant

D is the reference label position information, which is a distance between a reference label and a ZigBee gateway, and when there are a plurality of reference labels, D is mean value of distances between the plurality of reference labels and the ZigBee gateway.

7. The ZigBee-based article searching device of claim 6, wherein the ZigBee gateway is further used for sending trigger information to the article label according to a preset label name corresponding to the article label, so that the article label is activated.

8. The ZigBee-based article searching device of claim 7, further comprising an alarm module, wherein the data processing module is further used for:

judging whether a distance between a preset positioning label held by the user and the article label is greater than a set prompt distance;

when the distance between the positioning label and the article label is greater than the set prompt distance, the alarm module sends prompt information to the terminal device of the user; and when the distance between the positioning label and the article label is smaller than or equal to the set prompt distance, the ZigBee gateway sends trigger information to the article label according to a preset label name corresponding to the article label.

9. The ZigBee-based article searching device of claim 6, further comprising an alarm module, which is used for sending alarm information after the communication module sends the article position information to the terminal device of the user.

10. A ZigBee-based article searching device, comprising:

a ZigBee gateway, used for receiving an article label signal sent by an article label and detecting article label signal intensity;

a data processing module, used for generating article position information according to the article label signal intensity and reference label signal intensity corresponding to at least one preset reference label; and a communication module, used for sending the article position information to a terminal device of a user, wherein number of the reference labels is one, and the data processing module is used for:

generating the reference label signal intensity according to reference label position information;

generating a relative distance according to the reference label signal intensity and the article label signal intensity; and forming a circular range by taking the reference label as a circle center and taking the relative distance as a radius, and obtaining article position information from an area covered by the circular range, wherein generating the reference label signal intensity according to the reference label position information comprises:

calculating the reference label signal intensity according to the reference label position information through the following formula:

$$RSSI1 = -(A + 10 \times N \times lg(D)), \text{ wherein}$$

RSSI1 is the reference label signal intensity;

A is signal intensity of a reference label when a distance between the reference label and a ZigBee gateway is 1 meter;

N is a signal propagation constant;

D is the reference label position information, which is a distance between a reference label and a ZigBee gateway.

11. A ZigBee-based article searching system, comprising a terminal device, an article label, at least one reference label and the ZigBee-based article searching device of claim 6, wherein the article label is used for sending article label signal, and the terminal device is used for receiving the article position information.

12. The article searching system of claim 11, wherein the ZigBee gateway of the ZigBee-based article searching device is further used for sending trigger information to the article label according to a preset label name corresponding to the article label, so that the article label is activated.

13. The article searching system of claim 12, wherein the ZigBee-based article searching device further comprises an alarm module, and the data processing module of the ZigBee-based article searching device is further used for:

judging whether a distance between a preset positioning label held by the user and the article label is greater than a set prompt distance;

when the distance between the positioning label and the article label is greater than the set prompt distance, the alarm module sends prompt information to the terminal device of the user; and when the distance between the positioning label and the article label is smaller than or equal to the set prompt distance, the ZigBee gateway of the ZigBee-based article searching device sends trigger information to the article label according to a preset label name corresponding to the article label.

14. The article searching system of claim 11, wherein the ZigBee-based article searching device further comprises an alarm module, which is used for sending alarm information after the communication module of the Zigbee-based article searching device sends the article position information to the terminal device.

15. A ZigBee-based article searching system, comprising a terminal device, an article label, at least one reference label and the ZigBee-based article searching device of claim 10, wherein
 the article label is used for sending article label signal, and
 the terminal device is used for receiving the article position information.

\* \* \* \* \*